United States Patent
Hanaoka

(10) Patent No.: US 12,393,242 B2
(45) Date of Patent: Aug. 19, 2025

(54) USER SELECTABLE GAME FUNCTIONS BASED ON PREDICTED BATTERY CONSUMPTION AMOUNTS

(71) Applicant: CYGAMES, INC., Tokyo (JP)

(72) Inventor: Hiroki Hanaoka, Tokyo (JP)

(73) Assignee: CYGAMES, INC., Tokyo (JP)

( * ) Notice: Subject to any disclaimer, the term of this patent is extended or adjusted under 35 U.S.C. 154(b) by 0 days.

(21) Appl. No.: 18/051,741

(22) Filed: Nov. 1, 2022

(65) Prior Publication Data

US 2023/0088429 A1  Mar. 23, 2023

Related U.S. Application Data

(63) Continuation of application No. PCT/JP2021/017184, filed on Apr. 30, 2021.

(30) Foreign Application Priority Data

May 1, 2020 (JP) ................. 2020-081051

(51) Int. Cl.
G06F 1/26 (2006.01)
G06F 1/3212 (2019.01)
(Continued)

(52) U.S. Cl.
CPC ............. *G06F 1/26* (2013.01); *G06F 1/3212* (2013.01); *G06F 1/3228* (2013.01); *G06F 11/30* (2013.01)

(58) Field of Classification Search
CPC ........ G06F 1/26; G06F 1/3228; G06F 1/3212; G06F 11/30
(Continued)

(56) References Cited

U.S. PATENT DOCUMENTS 8,954,223 B2  2/2015  Hoshihara et al.
9,917,748 B2  3/2018  Komatsuzaki et al.
(Continued)

FOREIGN PATENT DOCUMENTS

CN   108932048 A   12/2018
JP   2003-209901 A   7/2003
(Continued)

OTHER PUBLICATIONS

Liam Tung, "Google: Here's how we predict battery life based on your usage patterns" https://www.zdnet.com/article/google-heres-how-wepredict-battery-life-based-on-your-usage-patterns/, Nov. 23, 2017 (4 pages).
(Continued)

*Primary Examiner* — Ji H Bae
(74) *Attorney, Agent, or Firm* — Osha Bergman Watanabe & Burton LLP

(57) ABSTRACT

A processing device may include: an information accumulating unit that obtains execution-time state information and battery information; an estimation-model generating unit that generates an estimation model for estimating a battery consumption amount when the piece of content is executed, from the information indicating the state of the terminal device on the basis of the execution-time state information and the battery information, which are accumulated in the storage unit; an estimation unit that obtains estimation-time state information indicating the state of the terminal device at a predetermined estimation timing and that estimates a battery consumption amount when the piece of content is executed at the terminal device in the state indicated by the estimation-time state information, on the basis of the estimation-time state information and the estimation model; and an output unit that outputs an estimation result obtained from the estimation unit.

6 Claims, 9 Drawing Sheets

(51) Int. Cl.
  *G06F 1/3228* (2019.01)
  *G06F 11/30* (2006.01)

(58) Field of Classification Search
  USPC .................................. 713/300, 340; 702/63
  See application file for complete search history.

(56) References Cited

U.S. PATENT DOCUMENTS

| | | | |
|---|---|---|---|
| 10,434,414 | B2 | 10/2019 | Morishita |
| 2006/0171673 | A1* | 8/2006 | Cole .................... H04N 21/454 386/346 |
| 2012/0001883 | A1* | 1/2012 | Tarkoma .................. G09G 5/00 345/211 |
| 2013/0031385 | A1* | 1/2013 | Seto .......................... G06F 1/28 713/300 |
| 2013/0275353 | A1* | 10/2013 | Ingrassia, Jr. ......... H04L 65/612 706/46 |
| 2013/0290523 | A1 | 10/2013 | Komatsuzaki et al. |
| 2017/0279697 | A1 | 9/2017 | Katsaros et al. |
| 2018/0115592 | A1* | 4/2018 | Samineni ................ H04L 65/80 |
| 2020/0286124 | A1* | 9/2020 | Hiremath ............... G06N 5/048 |

FOREIGN PATENT DOCUMENTS

| | | |
|---|---|---|
| JP | 4033427 B2 | 1/2008 |
| JP | 2012-068803 A | 4/2012 |
| JP | 2013-228902 A | 11/2013 |
| JP | 2020-028196 A | 2/2020 |

OTHER PUBLICATIONS

Denny Fischer, "Smart battery on Pixel:." https://www.smartdroid.de/smart-battery-on-pixel-googleerklaert-kurz-die-berechnung-der-restlichen-akkulaufzeit/, Nov. 23, 2017 (2 pages).

Joon-Myung Kang et. al., "Personalized Battery Lifetime Prediction for Mobile Devices based on Usage Patterns", JCSE, vol. 5, No. 4, pp. 338-345, Dec. 2011 (8 pages).

Xia Zhao et. al., "A System Context-aware Approach for Battery Lifetime Prediction in Smart Phones", SAC '11; Proceedings of the 2011 ACM Symposium on Applied Computing, pp. 641-646, Mar. 21-25, 2011 (7 pages).

Andres Munoz Medina et. al., "Learning Battery Consumption of Mobile Devices", https://research.google/pubs/pub45901/, 2016 (5 pages).

International Search Report issued in Application No. PCT/JP2021/017184 mailed on Jun. 15, 2021 (2 pages).

Office Action issued in Chinese Application No. 2021800461773; Dated Apr. 30, 2025 (8 pages).

* cited by examiner

FIG. 3

| ContentID | $Time_{start}$ | $Time_{end}$ | $Energy_{start}$ | $Energy_{end}$ | $K_1(OS)$ | $K_2(Network)$ | ... | $K_n(UA)$ |
|---|---|---|---|---|---|---|---|---|
| 001-NORMAL | 2020/02/01 12:14:01 | 2020/02/01 12:21:30 | 0.79 | 0.74 | OS001 | NW001 | ... | Mobile |
| 001-HARD | 2020/02/01 12:23:21 | 2020/02/01 12:40:18 | 0.73 | 0.66 | OS001 | NW001 | ... | Mobile |
| 001-HARD | 2020/02/01 12:59:15 | 2020/02/01 13:29:42 | 0.63 | 0.55 | OS001 | NW002 | ... | Mobile |
| ... | ... | ... | ... | ... | ... | ... | ... | ... |

FIG. 7

LIST OF BATTERY
CONSUMPTION AMOUNTS
FOR PIECES OF CONTENT

- GAME (9 INNINGS)      11%

- GAME (7 INNINGS)      8%

- PRACTICE (HITTING)    4%

- PRACTICE (DEFENSE)    5%

- PRACTICE (PITCHING)   4%

- TRADE                 6%

- DRAFT                 7%

RETURN

FIG. 8

| Content ID | Group ID |
|---|---|
| 001-NORMAL | G001 |
| 001-HARD | G013 |
| ⋮ | ⋮ |

FIG. 9

| ContentID | $Energy_{start}$ | $Energy_{end}$ | $K_1(OS)$ | $K_2(Network)$ | ... | $K_m(BLE)$ |
|---|---|---|---|---|---|---|
| 001-NORMAL | 0.80 | 0.75 | OS001 | NW001 | ... | OFF |
| 001-NORMAL | 0.75 | 0.73 | OS001 | NW001 | ... | OFF |
| 001-NORMAL | 0.70 | 0.67 | OS002 | NW001 | ... | ON |
| 001-HARD | 0.80 | 0.72 | OS002 | NW001 | ... | ON |
| 001-HARD | 0.75 | 0.69 | OS001 | NW001 | ... | OFF |
| 001-HARD | 0.70 | 0.65 | OS001 | NW001 | ... | ON |
| 001-HARD | 0.80 | 0.71 | OS003 | NW002 | ... | OFF |
| 001-HARD | 0.75 | 0.63 | OS001 | NW002 | ... | OFF |
| 001-HARD | 0.70 | 0.62 | OS002 | NW002 | ... | ON |
| ... | ... | ... | ... | ... | ... | ... |

USER SELECTABLE GAME FUNCTIONS BASED ON PREDICTED BATTERY CONSUMPTION AMOUNTS

TECHNICAL FIELD

The present invention relates to a processing device, a processing method, and a program.

BACKGROUND ART

In conventional research and products, hardware parts, such as CPUs and displays, are analyzed and application usage trends due to habitual behaviors of users are learned, whereby battery consumption amounts through execution of applications and future transitions of battery consumption amounts are predicted.

Non-Patent Literature 1 discloses a function for predicting and displaying a graph of the battery level up to a few hours ahead by reflecting, therein, the habitual behavior of a user.

A technique disclosed in Non-Patent Literature 2 classifies the state of a smartphone into five states, and a user thereof is characterized on the basis of the times occupied by the individual states. Specifically, the five states are: 1) standby; 2) call; 3) data communication using a first method; 4) data communication using a second method; and 5) others. Then, the logs of the user are analyzed, thereby analyzing the differences in the usage patterns of the user on the basis of the five states.

Non-Patent Literature 3 discloses a technique for modeling a battery consumption amount as a function in which measured values of hardware parts, such as a CPU and a display, that use large amounts of power consumption are used as parameters.

Non-Patent Literature 4 discloses a method for learning a model for a battery consumption amount from a long-term profile for a day or a few days, thereby specifying a battery consumption amount for "in the wild". With this method, a battery consumption amount can be estimated on a hardware-part basis or on an application basis.

Patent Literature 1 discloses a mechanism that promotes power saving by comparing the battery level and a given threshold.

Patent Literature 2 discloses a mechanism that prompts charging on the basis of a comparison between the battery level and a threshold, when driving of an electric vehicle is finished. Specifically, Patent Literature 2 proposes an idea in which the usage pattern of the vehicle is learned, and a threshold is set on the basis of the result of the learning.

Patent Literature 3 discloses a mechanism that learns a daily charging location and a daily charging time zone from the histories of charging location, charging start time, and charging duration and that performs charging guidance only when a user seems to be able to execute charging. Specifically, proposed is an idea in which the remaining amount of power in the battery and a power consumption amount that is required for daily driving are compared to judge whether charging guidance can be performed.

Patent Literature 4 discloses a mechanism in which the battery level and a given threshold are compared, thereby changing a parameter in a game. According to a modification of an embodiment of this patent, Patent Literature 4 proposes an example in which it becomes impossible to select a unit game when the battery level becomes lower than a predetermined remaining level. That is, in this patent, a game developer designs, in advance, a threshold for the battery level on a piece-of-content basis.

CITATION LIST

Patent Literature
{Patent Literature 1} Publication of Japanese Patent No. 4033427
{Patent Literature 2} Japanese Unexamined Patent Application, Publication No. 2003-209901
{Patent Literature 3} U.S. Pat. No. 8,954,223B2
{Patent Literature 4} U.S. Ser. No. 10/434,414B2
Non-Patent Literature
(Non-Patent Literature 1) Denny Fischer, Smart battery on Pixel, https://support.google.com/pixelphone/forum/AAAAb4-OgUstyVoEaFNJ1k/?hl=by, retrieved Nov. 25, 2019, November 2017.
(Non-Patent Literature 2) Joon-Myung Kang, Sin-Seok Seo, and James Won-Ki Hong, "Personalized Battery Lifetime Prediction for Mobile Devices based on Usage Patterns," Journal of Computing Science and Engineering, vol. 5, December 2011, 338-345, doi: 10.5626/JCSE.2011.5.4.338.
(Non-Patent Literature 3) Xia Zhao, Yao Guo, Qing Feng, and Xiangqun Chen, 2011, "A System Context-aware Approach for Battery Lifetime Predic-tion in Smart Phones," In Proceedings of the 2011 ACM Symposium on Applied Computing, SAC '11, ACM, TaiChung, Taiwan, 641-646, doi: 10.1145/1982185.1982327. http://doi-.acm.org/10.1145/1982185.1982327.
(Non-Patent Literature 4) Andres Munoz Medina, Ashish Sharma, Felix Yu, Paul Eastham, Sergei Vassilvitskii, and Umar Syed, 2016, "Learning mobile phone battery consumption amounts.", https://research.google/pubs/pub45901/.

SUMMARY OF INVENTION

Technical Problem

In recent years, portable-type terminal devices, such as smartphones, tablet terminals, smart watches, mobile phones, handheld game consoles, and laptop computers, have become widely used. In general, such a portable-type terminal device intermittently undergoes a charging operation. For example, the portable-type terminal device does not undergo a charging operation while the user is out of the house, and the portable-type terminal device undergoes a charging operation at an arbitrary timing while the user stays home. Thus, while considering the battery level, the user needs to take measures to restrict the use of the terminal device so as to make the battery last until the timing of the next charging, in some cases.

Thus, there is demand for a technique for notifying a user of a battery consumption amount in the case where predetermined processing (for example, a piece of content included in a game application) using a terminal device is executed, before the predetermined processing is executed. According to the technique, while considering the battery consumption amount in the case where predetermined processing is executed, the user can judge whether the predetermined processing is executed or not. However, it is difficult to estimate, in advance, a power consumption amount when a specific function of an application is operated on a specific terminal. For example, in an application that has complex functions like a game application, sound, GPU, and network functions are combined in a complex manner; thus, the power consumption amount when a specific function is executed can be equal to the number of function multiplied by the number of devices. None of the prior art discloses this problem.

Note that the prior art (for example, Non-Patent Literature 4) discloses a technology for estimating a battery consumption amount on an application basis, on the basis of the habitual usage trend of a user. However, in general, an application is multifunctional, and the usage time of a user and the hardware processing load can be different depending on which function in the application is used. Thus, estimation of a battery consumption amount, on an application basis, based on the habitual usage trend of a user is suitable for estimation thereof on a relatively long-term basis, e.g., on a daily basis or on a monthly basis, but is not suitable for estimation thereof on a shorter-term basis. For a technology for notifying a user of a battery consumption amount in the case where predetermined processing is executed using a terminal device, before the predetermined processing is executed, estimation of a battery consumption amount on a shorter-term basis is required, instead of estimation thereof on a relatively long-term basis, e.g., on a daily basis or on a monthly basis.

Furthermore, in a conventional technology (for example, Non-Patent Literature 3), a battery consumption amount is modeled as a function in which measured values of hardware parts, such as a CPU and a display, that use large amounts of power consumption are used as parameters. In the case of this technology, after predetermined processing is started, a battery consumption amount can be estimated on the basis of the measured values of the hardware parts when the predetermined processing is executed. However, it is impossible to perform estimation and notification to the user before the predetermined processing is started.

The present invention addresses the problem of realizing a technique for notifying a user of a battery consumption amount in the case where predetermined processing using a terminal device is executed, before the predetermined processing is executed.

Solution to Problem

The present invention provides a processing device including:
an information accumulating unit that obtains execution-time state information indicating the state of a terminal device when a piece of content in an application installed in the terminal device is executed and battery information indicating a battery consumption amount when the piece of content is executed and that accumulates the obtained information in a storage means;
an estimation-model generating unit that generates an estimation model for estimating a battery consumption amount when the piece of content is executed, from the information indicating the state of the terminal device on the basis of the execution-time state information and the battery information, which are accumulated in the storage means;
an estimation unit that obtains estimation-time state information indicating the state of the terminal device at a predetermined estimation timing and that estimates a battery consumption amount when the piece of content is executed at the terminal device in the state indicated by the estimation-time state information, on the basis of the estimation-time state information and the estimation model; and
an output unit that outputs an estimation result obtained from the estimation unit.

Furthermore, the present invention provides a processing method for a computer to:
obtain execution-time state information indicating the state of a terminal device when a piece of content in an application installed in the terminal device is executed and battery information indicating a battery consumption amount when the piece of content is executed and accumulates the obtained information in a storage means;
generate an estimation model for estimating a battery consumption amount when the piece of content is executed, from the information indicating the state of the terminal device, on the basis of at least the execution-time state information and the battery information, which are accumulated in the storage means; and
obtain estimation-time state information indicating the state of the terminal device at a predetermined estimation timing, estimates a battery consumption amount when the piece of content is executed at the terminal device in the state indicated by the estimation-time state information, on the basis of the estimation-time state information and the estimation model, and outputs an estimation result.

Furthermore, the present invention provides a program for causing a computer to function as:
an information accumulating means for obtaining execution-time state information that indicates the state of a terminal device when a piece of content in an application installed in the terminal device is executed and battery information that indicates a battery consumption amount when the piece of content is executed and for accumulating the obtained information in a storage means;
an estimation-model generating means for generating an estimation model that estimates a battery consumption amount when the piece of content is executed, from the information indicating the state of the terminal device on the basis of the execution-time state information and the battery information, which are accumulated in the storage means;
an estimation means for obtaining estimation-time state information indicating the state of the terminal device at a predetermined estimation timing and for estimating a battery consumption amount when the piece of content is executed at the terminal device in the state indicated by the estimation-time state information, on the basis of the estimation-time state information and the estimation model; and
an output means for outputting an estimation result obtained from the estimation means.

Advantageous Effects of Invention

According to the present invention, it is possible to realize a technique for notifying a user of a battery consumption amount in the case where predetermined processing using a terminal device is executed, before the predetermined processing is executed.

BRIEF DESCRIPTION OF DRAWINGS

FIG. 3 is a view schematically showing an example of information processed by the processing device according to this embodiment.

FIG. 7 is a view schematically showing an example of a screen displayed at the terminal device according to this embodiment.

FIG. 8 is a view schematically showing an example of information processed by the processing device according to this embodiment.

FIG. 9 is a view schematically showing an example of information processed by the processing device according to this embodiment.

DESCRIPTION OF EMBODIMENTS

Overview

Figure 1:
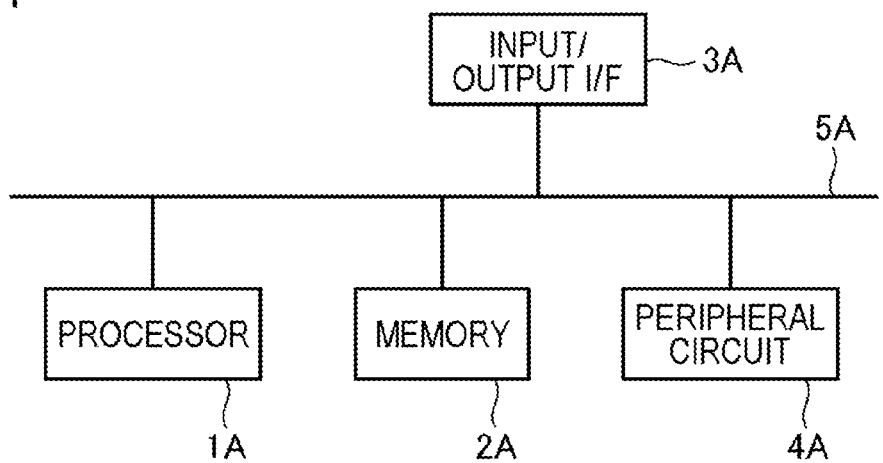
FIG. 1 is a view showing an example of the hardware configuration of a processing device according to an embodiment.

A processing device according to an embodiment of the present invention generates an estimation model showing the relationship between the state of a terminal device and a battery consumption amount in the case where each piece of content in an application is executed in that state. Then, the processing device estimates a battery consumption amount in the case where each piece of content is executed in the state of the terminal device at the time of estimation, on the basis of the estimation model, and notifies a user of the battery consumption amount.

The application is a game application, for example, but is not limited thereto. The application provides one or a plurality of executable pieces of content. The user selects one piece of content from among the plurality of pieces of content and executes the selected piece of content. For example, in the case of a game application related to baseball, pieces of content, such as "game (9 innings)", "game (7 innings)", "practice (batting)", "practice (defense)", "practice (pitching)", "trade", and "draft", can be provided.

A piece of content is one of the processing procedures that can be executed in an application. Thus, the hardware processing load range while one piece of content is executed (the range from the time when the processing load is the largest to the time when the processing load is the smallest) is less than the hardware processing load range while one application, in which a plurality of pieces of content can be sequentially executed in a selective manner, is executed. Furthermore, the time range required to execute one piece of content (the time from the start to the end of the piece of content) is less than the time range required to execute one application, in which a plurality of pieces of content can be sequentially executed in a selective manner.

In a technique for notifying a user f a battery consumption amount in the case where predetermined processing using a terminal device is executed, before the predetermined processing is executed, the technique is configured such that a technique for estimating a battery consumption amount on a piece-of-content basis is adopted, and a battery consumption amount in the case where each piece of content is executed is estimated and notified to the user before the piece of content is executed, whereby useful information with higher accuracy can be provided to the user.

<Hardware Configuration>

Next, the hardware configuration of the processing device will be described below. The processing device may be a terminal device operated by a user or may be a server that communicates with this terminal device. The terminal device is, for example, a portable-type terminal device, such as a smartphone, a tablet terminal, a smart watch, a mobile phone, a handheld game console, or a laptop computer, but is not limited thereto.

Individual functional units of the processing device are realized by an arbitrary combination of hardware and software including: a central processing unit (CPU) of an arbitrary computer; a memory; a program to be loaded into the memory; a storage unit, such as a hard disk, that stores the program (that can store not only programs stored in advance at the time of shipping of the device but also programs downloaded from a storage medium, such as a compact disc (CD), and a server etc. on the Internet); and an interface for network connection. Then, it is understood by those skilled in the art that various modifications are possible for the realization method and the device.

FIG. 1 is a block diagram illustrating the hardware configuration of the processing device. As shown in FIG. 1, the processing device has a processor 1A, a memory 2A, an input/output interface 3A, a peripheral circuit 4A, and a bus 5A. The peripheral circuit 4A includes various modules. Note that the processing device need not have the peripheral circuit 4A.

The processing device may also be configured, physically and logically, of one device. The processing device may also be configured of a plurality of devices separated physically and/or logically. In that case, each of the plurality of devices can include the above-described hardware configuration.

The bus 5A is a data transmission line via which data is sent and received between the processor 1A, the memory 2A, the peripheral circuit 4A, and the input/output interface 3A. The processor 1A is, for example, an arithmetic processing device, such as a CPU or a graphics processing unit (GPU). The memory 2A is, for example, a memory, such as a random access memory (RAM) or a read only memory (ROM). The input/output interface 3A includes an interface for obtaining information from an input device, an external device, an external server, an external sensor, etc. and an interface for outputting information to an output device, the external device, the external server, etc. The input device includes, for example, a keyboard, a mouse, a microphone, or the like. The output device includes, for example, a display, a speaker, a printer, a mailer, or the like. The processor 1A can issue commands to the individual modules and perform calculation on the basis of calculation results from the modules.

<Functional Configuration>

Figure 2:
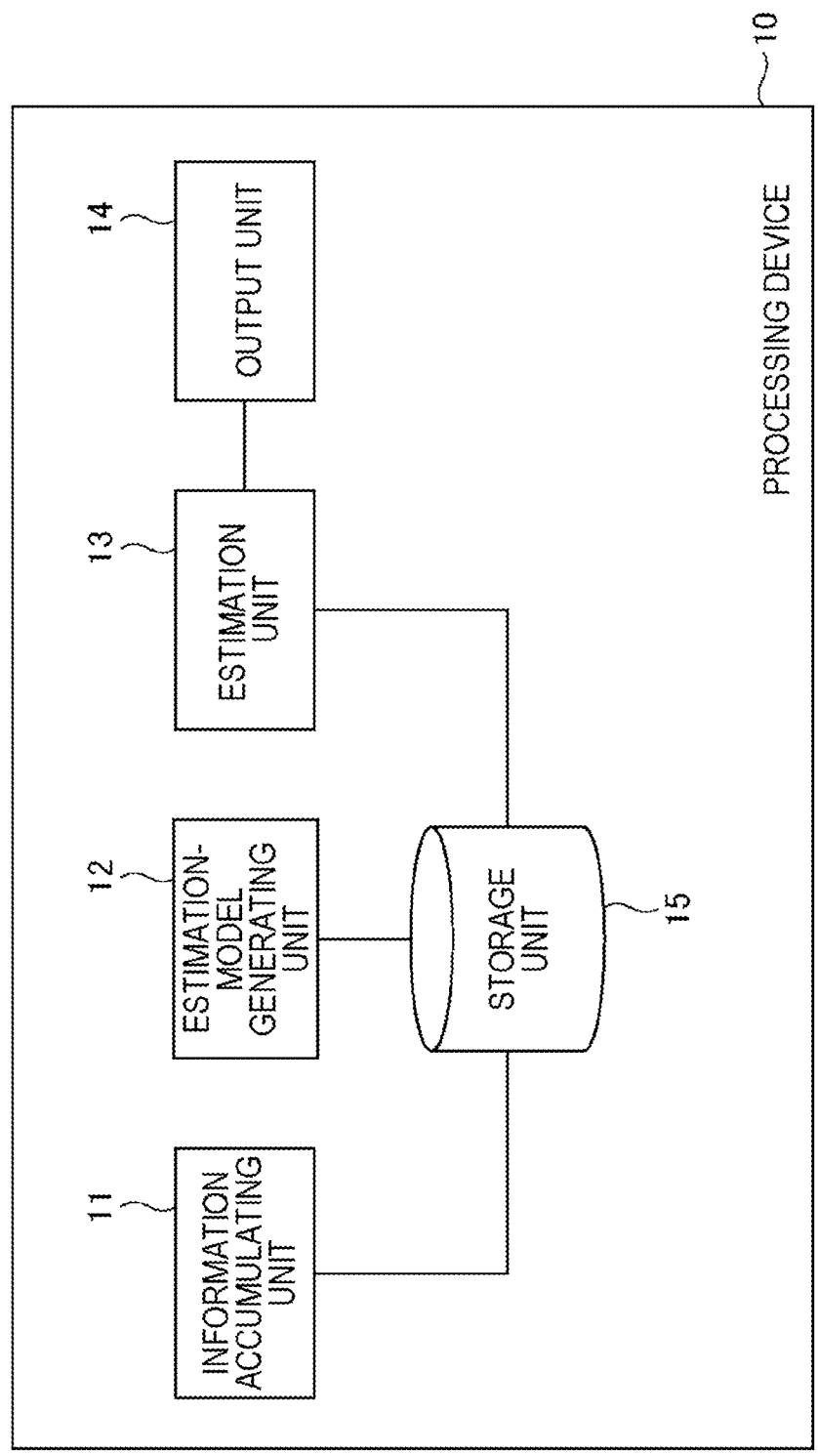
FIG. 2 is a view showing an example of a functional block of the processing device according to this embodiment.

Next, the functional configuration of the processing device will be described below. FIG. 2 shows an example of a functional block diagram of a processing device 10. As shown in FIG. 2, the processing device 10 has an information accumulating unit 11, an estimation-model generating unit 12, an estimation unit 13, an output unit 14, and a storage unit 15.

The information accumulating unit 11 obtains execution-time state information that indicates the state of the terminal device when a piece of content in an application installed in the terminal device is executed and battery information that indicates a battery consumption amount when the piece of content is executed, and accumulates the execution-time state information and the battery information in the storage unit 15 as historical information. In the case where the application provides a plurality of pieces of content, the information accumulating unit 11 accumulates the execution-time state information and the battery information in the storage unit 15 for each of the pieces of content.

In the case where the processing device 10 is the terminal device, the information accumulating unit 11 obtains the execution-time state information and the battery information that are related to the terminal device itself, via a sensor or a function included in the terminal device itself. On the other hand, in the case where the processing device 10 is the server that communicates with the terminal device, the information accumulating unit 11 receives, from the terminal device through a network such as the Internet, execution-time state information and battery information that are related to the terminal device and that are collected by the terminal device.

The execution-time state information, which indicates the state of the terminal device, can include arbitrary information that can be obtained and that can affect the battery consumption amount. For example, although examples of the execution-time state information include the type of operating system (OS) installed in the terminal device, the connection method for a communication network, the brightness of the display, the type of application running in the background, CPU usage, and network traffic (bytes/second), the execution-time state information is not limited thereto.

A battery consumption amount when a piece of content is executed can be calculated on the basis of a battery level when the piece of content is started and a battery level when the piece of content is ended.

FIG. 3 schematically shows an example of historical information indicating the execution-time state information and the battery information. In the example shown in the figure, a content ID, content-start date and time ($Time_{start}$), which are the date and time when execution of a piece of content is started, content-end date and time ($Time_{end}$), which are the date and time when the execution of the piece of content is ended, a battery level ($Energy_{start}$) at the content-start date and time, a battery level ($Energy_{end}$) at the content-end date and time, the type of OS ($K_1(OS)$) when the piece of content is executed, a connection method ($K_2(Network)$) for a communication network when the piece of content is executed, and the type of terminal device ($K_n(UA)$) are linked with one another.

Figure 4:
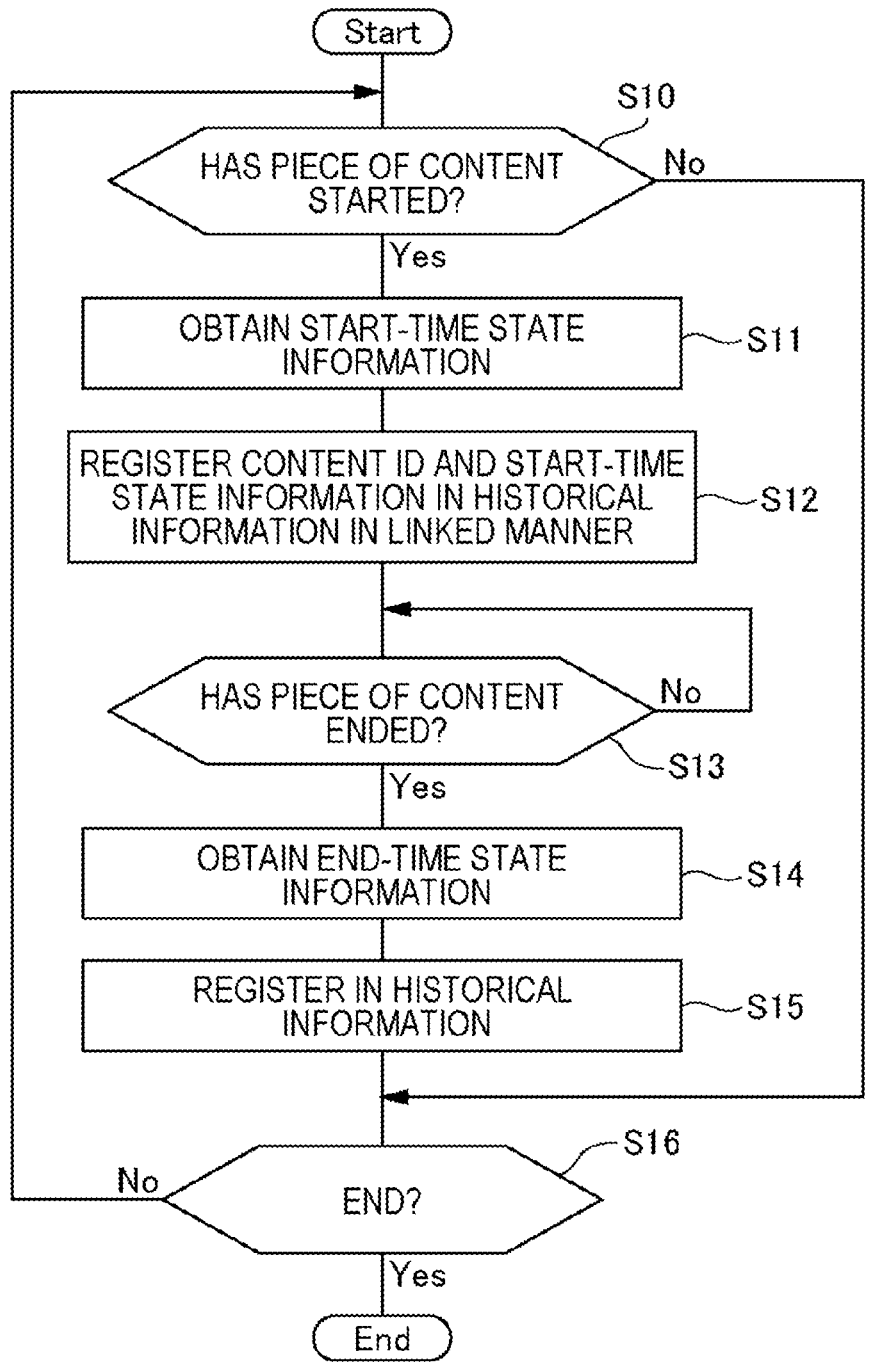
FIG. 4 is a flowchart showing an example of the flow of processing performed at the processing device according to this embodiment.

Here, an example of the flow of processing executed by the information accumulating unit 11 will be described by using a flowchart shown in FIG. 4. Here, it is assumed that the processing device 10 is the terminal device.

The information accumulating unit 11 monitors the start of execution of a piece of content (S10). If the information accumulating unit 11 detects the start of execution of a piece of content (Yes in S10), the information accumulating unit 11 obtains start-time state information indicating the state of the terminal device (execution-time state information) and a battery level at that time (S11). Then, the information accumulating unit 11 registers the obtained start-time state information in the historical information (see FIG. 3), which is stored in the storage unit 15, in linkage with the content ID of the piece of content that is started to be executed (S12).

Thereafter, the information accumulating unit 11 monitors the end of execution of the piece of content (S13). If the information accumulating unit 11 detects the end of execution of the piece of content (Yes in S13), the information accumulating unit 11 obtains end-time state information indicating a battery level of the terminal device at that time (S14) and registers the obtained end-time state information in the historical information (see FIG. 3), which is stored in the storage unit 15 (S15).

The information accumulating unit 11 repeats the above-described processing. As a result, the historical information, such as that shown in FIG. 3, is accumulated. Note that, in the case where the processing device 10 is the server, for example, the terminal device executes the processing shown in the flowchart of FIG. 4 and accumulates the historical information in the terminal device. Then, the terminal device sends the historical information accumulated in the terminal device itself to the server at an arbitrary timing. Alternatively, it is also possible that, when the terminal device executes the processing shown in the flowchart of FIG. 4 and obtains the start-time state information and the end-time state information in S11 and S14, respectively, the terminal device sends the obtained information to the server through real-time processing. Then, the server may register, in the server itself, the received start-time state information and end-time state information.

Returning to FIG. 2, the estimation-model generating unit 12 generates an estimation model that estimates "a battery consumption amount when a piece of content is executed" from "information indicating the state of the terminal device" on the basis of the historical information (the execution-time state information and the battery information), which is accumulated in the storage unit 15.

The estimation model may also be, for example, a model generated through arbitrary machine learning based on teacher data in which information indicating the state of the terminal device is linked with a battery consumption amount ($=(Energy_{start})-(Energy_{end})$) when a piece of content is executed in that state. In this case, an output from the estimation model becomes a battery consumption amount when the piece of content is executed. Alternatively, the estimation model may also be, for example, a model generated through arbitrary machine learning based on teacher data in which information indicating the state of the terminal device, a battery level ($Energy_{start}$) before a piece of content is executed, and a battery level ($Energy_{end}$) after the piece of content is executed are linked with one another. In this case, an output from the estimation model becomes the battery level after the piece of content is executed. Note that, in either case, a battery consumption amount is estimated.

Alternatively, the estimation model may also be a model that checks, through pattern matching or the like, a table indicating the relationship between information indicating the state of the terminal device and a battery consumption amount in the case where a piece of content is executed in that state, thereby identifying a battery consumption amount linked with a key (information indicating the state of the terminal device). Alternatively, the estimation model may also be a model that checks, through pattern matching or the like, a table indicating the relationship among information indicating the state of the terminal device, a battery level ($Energy_{start}$) before a piece of content is executed, and a battery level ($Energy_{end}$) after the piece of content is executed, thereby identifying a battery consumption amount linked with a key (information indicating the state of the terminal device and the battery level ($Energy_{start}$) before the piece of content is executed).

Alternatively, the estimation model may also be a model that uses a technique for performing mapping on a vector for measuring a correlation amount.

Note that, in the case where the application provides a plurality of pieces of content, the estimation-model generating unit 12 can generate an estimation model for each of the pieces of content.

The estimation unit 13 obtains, at a predetermined estimation timing, estimation-time state information indicating the state of the terminal device and estimates a battery consumption amount when a piece of content is executed at the terminal device in the state indicated by the estimation-time state information, on the basis of the estimation-time state information and the estimation model.

The estimation-time state information includes the same kinds of information as those of the execution-time state information. Although examples of the estimation-time state information include, for example, the type of an operating system (OS) installed in the terminal device, a connection method for a communication network, the brightness of the display, and the type of application running in the background, the estimation-time state information is not limited thereto. Furthermore, depending on the content of the estimation model, the battery level at the time of estimation is included in the estimation-time state information.

In the case where the processing device 10 is the terminal device, the estimation unit 13 obtains the estimation-time state information related to the terminal device itself via a sensor or a function included in the terminal device itself. On the other hand, in the case where the processing device 10 is the server that communicates with the terminal device, the estimation unit 13 receives the estimation-time state information related to the terminal device and collected by the terminal device, from the terminal device through a network such as the Internet.

The output unit 14 outputs an estimation result obtained from the estimation unit 13. In the case where the processing device 10 is the terminal device, the output unit 14 outputs the estimation result via the output device such as the display and the speaker included in the terminal device. On the other hand, in the case where the processing device 10 is the server that communicates with the terminal device, the output unit 14 sends an estimation result to the terminal device. Then, the terminal device outputs the received estimation result via the output device such as the display and the speaker included in the terminal device itself.

Figure 5:
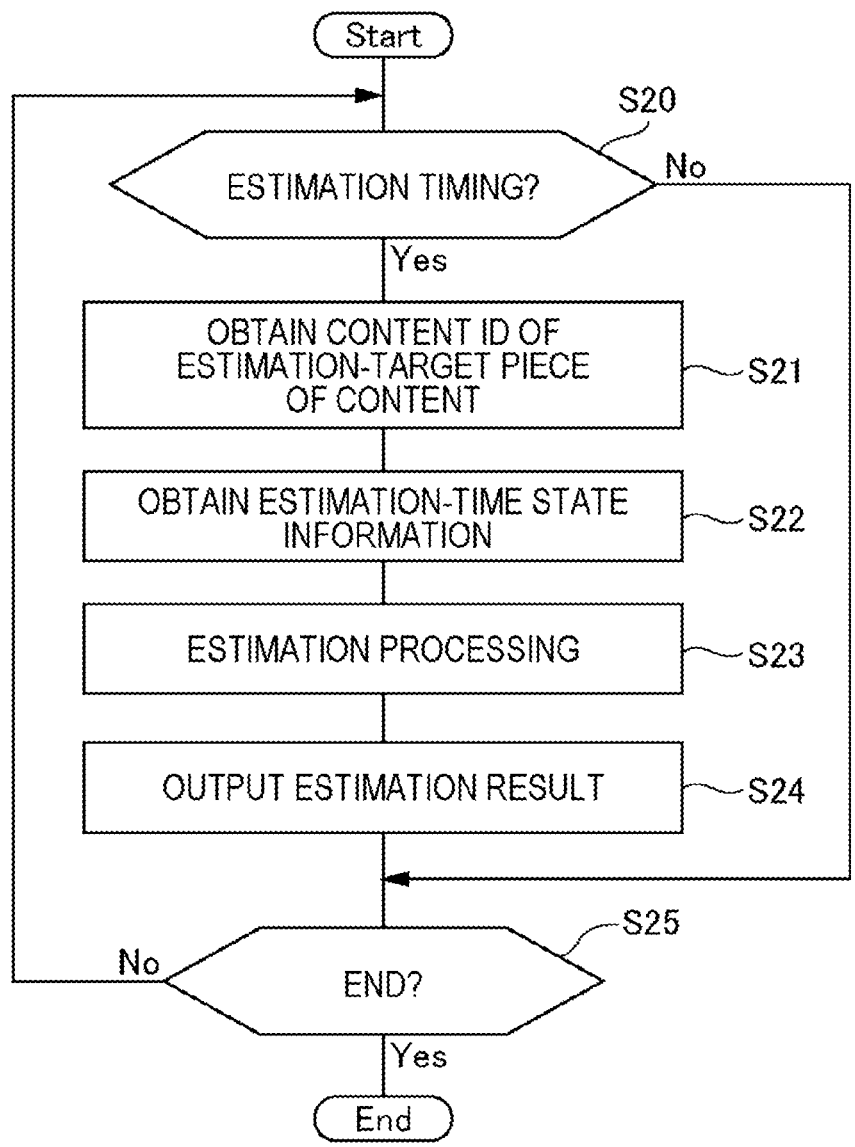
FIG. 5 is a flowchart showing an example of the flow of processing performed at the processing device according to this embodiment.

Here, an example of the flow of processing performed by the estimation unit 13 and the output unit 14 will be described by using a flowchart shown in FIG. 5.

First, the estimation unit 13 monitors the arrival of an estimation timing to estimate a battery consumption amount (S20). Specific examples of the estimation timing will be described later.

Then, when the estimation unit 13 detects the arrival of an estimation timing (Yes in S20), the estimation unit 13 obtains the content ID of an estimation-target piece of content (S21). The number of estimation-target pieces of content may be one or more. Specific examples of the estimation-target piece of content will be described later.

Furthermore, the estimation unit 13 obtains estimation-time state information indicating the state of the terminal device at that time (S22). The estimation unit 13 may also obtain a battery level at the time of estimation, as the estimation-time state information. Note that the order of processing steps S21 and S22 is not limited thereto.

Next, the estimation unit 13 estimates, on the basis of an estimation model for the content ID obtained in S21 and the estimation-time state information obtained in S22, a battery consumption amount in the case where the piece of content indicated by this content ID is executed at the terminal device in the state indicated by this estimation-time state information (S23).

Next, the output unit 14 outputs the estimation result obtained through the estimation processing in S23 (S24).

Here, examples of an estimation timing, an estimation-target piece of content, and an estimation-result output screen will be described below.

Example 1

In this example, the estimation timing is a timing of acceptance of an input (user input) for displaying a reception screen on which an input for starting execution of a piece of content is to be accepted. Then, in this example, the estimation-target pieces of content are pieces of content for each of which an input for starting execution can be accepted on this reception screen.

The estimation unit 13 obtains the estimation-time state information in response to acceptance of an input for displaying this reception screen and estimates battery consumption amounts when the above-described estimation-target pieces of content are individually executed at the terminal device in the state indicated by the estimation-time state information, on the basis of the estimation-time state information and the individual estimation models.

Figure 6:
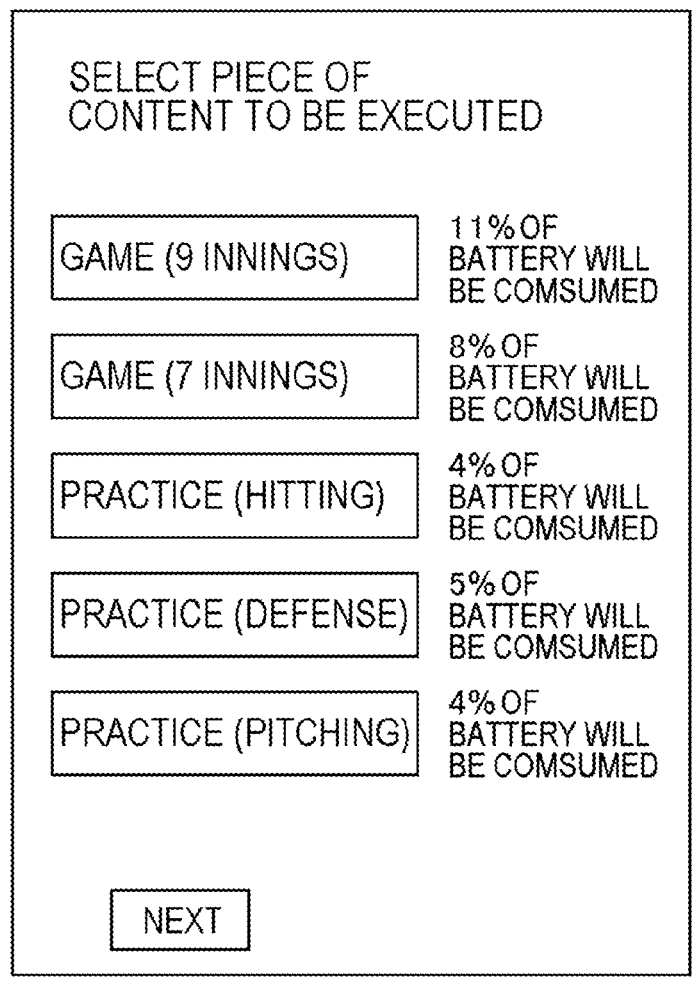
FIG. 6 is a view schematically showing an example of a screen displayed at a terminal device according to this embodiment.

Then, the output unit 14 displays the estimation results, on this reception screen, in linkage with the individual pieces of content. FIG. 6 schematically shows an example of this reception screen displayed at the terminal device in this example. In this example, an application is a game application related to baseball. Then, an input for starting execution of a piece of content, such as "game (9 innings)", "game (7 innings)", "practice (batting)", "practice (defense)", or "practice (pitching)", can be accepted on this reception screen. Then, prediction results of battery consumption amounts when the individual pieces of content are executed at that time are shown in linkage with the individual pieces of content.

Example 2

In this example, the estimation timing is a timing of acceptance of an input (user input) for displaying a list of battery consumption amounts for a plurality of pieces of content provided by an application. Then, in this example, estimation-target pieces of content are all pieces of content provided by the application.

The estimation unit 13 obtains the estimation-time state information in response to acceptance of an input for displaying this list and estimates battery consumption amounts when the above-mentioned estimation-target pieces of content are individually executed at the terminal device in the state indicated by the estimation-time state information, on the basis of the estimation-time state information and the individual estimation models.

Then, the output unit 14 displays, on the screen displaying this list, the estimation results in linkage with the individual pieces of content. FIG. 7 schematically shows an example of the screen displayed at the terminal device in this example. In this screen, prediction results of battery consumption amounts in the case where the individual pieces of content are executed at that time are shown in linkage with all the individual pieces of content provided by the application.

Note that, in FIGS. 6 and 7, although the battery consumption amounts are shown as percentages of power consumption amounts with respect to the fully-charged power amount, it is also possible to show the battery consumption amounts by another method. However, in general terminal devices, the battery level is shown as a percentage of the remaining power amount with respect to the fully-charged power amount. Thus, when the battery consumption amounts are shown by the method shown in the figures, it is easy for the user to compare the battery level and the battery consumption amounts, which is preferable.

Furthermore, in FIGS. 6 and 7, although the output unit 14 displays, as the estimation results, battery consumption amounts that will be consumed through execution of the pieces of content, it is also possible that the output unit 14 outputs, as the estimation results, predicted values of battery levels after execution of the pieces of content.

<Modification 1>

In this modification, a plurality of pieces of content provided by an application are divided into groups by similarity of how the battery is consumed. Then, group information indicating groups to which the individual pieces of content belong, shown in FIG. 8, is stored in advance in the processing device 10.

The estimation-model generating unit 12 generates, for each of the groups, the above-described estimation model on the basis of the historical information (the execution-time state information and the battery information) on the pieces of content that belong to that group. That is, in this modification, the estimation model is generated for each group, not for each piece of content.

Then, the estimation unit 13 identifies the group to which a target piece of content for which a battery consumption amount is to be estimated belongs, and estimates a battery consumption amount when this piece of content is executed at that time, on the basis of the estimation model for the identified group.

<Modification 2>

In the case where the processing device 10 is the server, the processing device 10 can obtain the historical information (the execution-time state information and the battery information) from terminal devices of a plurality of users. The processing device 10 may also generate, for each of the users, an estimation model by processing the historical information for that user or may also generate, for the plurality of users, an estimation model by collectively processing the historical information for the plurality of users. Furthermore, in the case where attribute information (sex, age, nationality, application usage history (the number of years, or the like), terminal-device information (maker, model number, OS, career providing communication service, etc.), etc.) of the plurality of users has been registered in the processing device 10, it is also possible that the processing device 10 divides the users into groups by the same or similar attribute information, collectively processes, for each of the groups, the historical information on the users who belong to that group, and generates an estimation model for each of the groups.

<Modification 3>

The processing device 10 generates an estimation model(s) on the basis of at least the execution-time state information and the battery information and estimates a battery consumption amount(s) on the basis of at least the execution-time state information and the battery information. It is also possible that the processing device obtains information other than the execution-time state information and the battery information and that could affect a battery consumption amount(s), from an external device (device other than the terminal device), for example, and performs generation of an estimation model(s) and estimation of a battery consumption amount(s) by additionally using this information. For example, it is also possible to build, in advance, an estimation model for each part (hardware) in use, and to estimate a battery consumption amount by combining this estimation model and an estimation model generated based on the execution-time state information.

Example

Next, an Example in which the processing device 10 of this embodiment is embodied more concretely will be described below.

This Example shows a method in which, when a transition is made to a screen for allowing the user to select a piece of content to be executed, battery consumption amounts in the case where pieces of content to be displayed on this screen so as to be selectable are executed are predicted, and the prediction results are displayed on this screen. For example, when a transition is made to a screen for allowing the user to select from two pieces of content (001-NORMAL and 001-HARD), the processing device 10 of this Example predicts battery consumption amounts in the case where the pieces of content are executed at that time, for the individual pieces of content, as in "001-NORMAL consumes 0.5% of the battery" and "001-HARD consumes 0.8% of the battery", and displays the predicted results together with buttons for starting the pieces of content.

The system architecture of the processing device 10 of this Example is divided into an estimation phase for predicting a battery consumption amount for each piece of content and a learning phase for generating an estimation model used for prediction. Here, after three modules for realizing the processing device 10 of this Example are described, the learning phase and the estimation phase will be described in detail.

"Module"

The processing device 10 of this Example is configured to include three modules, i.e., [M1] Learning Module, [M2] Model Data, and [M3] Inference Module.

[M1] Learning Module is a function to which historical information (the execution-time state information and the battery information) obtained when the developer or the user has executed pieces of content is input and from which a model for predicting a battery consumption amount for each piece of content is output as M2. The historical information serving as an input to M1 can be defined as time-series data as shown in the following Expression (1) and Expression (2).

{Expression 1}

$$\text{History} = \text{Item}_{t1}, \ldots, \text{Item}_{t_k} \qquad \text{Expression(1)}$$

{Expression 2}

$$\text{Item}_{time\text{-}index} = (\text{ContentID}, \text{Time}_{start}, \text{Time}_{end}, \\ \text{Energy}_{start}, \text{Energy}_{end}, [(K_1, V_1), \ldots (K_n, V_n)]) \qquad \text{Expression (2)}$$

Here, $\text{Item}_t$ is an item of historical information for each piece of content. ContentID is a unique identifier set in advance for each piece of content or for each group of pieces of content. $\text{Time}_{start}$ indicates the time when the corresponding piece of content is started. $\text{Time}_{end}$ indicates the time when the corresponding piece of content is ended. $\text{Energy}_{start}$ indicates the battery level at the time when the corresponding piece of content is started. $\text{Energy}_{end}$ indicates the battery level at the time when the corresponding piece of content is ended. It is assumed that the values of $\text{Energy}_{start}$ and $\text{Energy}_{end}$ are floating-point numbers within the range [0,1]. When the values of $\text{Energy}_{start}$ and $\text{Energy}_{end}$ are 0, it indicates that the battery has been fully discharged (the remaining amount is 0). Then, when the values of $\text{Energy}_{start}$ and $\text{Energy}_{end}$ are 1, it indicates that the battery has been fully charged (fully-charged state).

$(K_i,V_i)$ is a pair consisting of Key indicating the type of hardware-component/sensor information and Value indicating the value thereof. This Key-Value pair includes, for example, static information, such as the type of OS, and dynamically changing information, such as a network connection method. As the historical information, it is possible to implement historical information that the developer has accumulated for debugging or testing before release or historical information that the user has accumulated when executing pieces of content at the same terminal in the past. An example of implementation of the historical information is shown in FIG. 3.

[M2] Model Data is estimation-model data that is output by M1 and that is input to M3. Although the specific implementation of this module is set in accordance with implementation of M1, an example thereof is shown in FIG. 9. The details of FIG. 9 will be described later.

[M3] Inference Module is a function that receives, when a transition is made to a screen for allowing the user to select a piece of content to be executed, a list of pieces of content (list of ContentID) to be displayed on that screen, the battery level ($\text{Energy}_{start}$) of the smartphone at that time, and hardware-component/sensor information ($[(K_1,V_1), \ldots (K_m, V_m)]$) at that time, as inputs, that predicts, on the assumption that the user executes the piece of content corresponding to each of the received ContentID from the time of input, the battery level ($\text{Energy}_{end}$) at the time when execution of the piece of content is ended, and that outputs the predicted battery level ($\text{Energy}_{end}$). This function is indicated by the following Expression (3) and Expression (4).

{Expression 3}

$\text{Input}_{inference}$=array of (ContentID,$\text{Energy}_{start}$,$[(K_1, V_1), \ldots ,(K_m,V_m)]$)  Expression (3)

{Expression 4}

$\text{Output}_{inference}$=array of (ContentID,$\text{Energy}_{end}$)  Expression (4)

Although the specific implementation of this module is set in accordance with the implementation of M1, this Example adopts, as the simplest Example, a method for performing estimation through pattern matching using a table. As other implementation examples, it is also possible to extract features for performing certain machine learning or to perform mapping on a vector for measuring a correlation amount.

Learning Phase

Next, the learning phase of this Example will be described below. In the learning phase of this Example, a table for performing estimation through pattern matching is generated by using the historical information (the execution-time state information and the battery information) obtained when the developer or the user has executed pieces of content of the game. For example, the processing device 10 of this Example generates a table defined as in the following Expression (5) on the basis of the historical information shown in FIG. 3.

{Expression 5}

PatternMatchTable=array of (ContentID,$\text{Energy}_{start}$, $\text{Energy}_{end}$,$[(K_1,V_1), \ldots ,(K_m,V_m)]$)  Expression (5)

An example of the table defined by Expression (5) is shown in FIG. 9. In the table shown in FIG. 9, for each ContentID, $\text{Energy}_{start}$ is set at intervals of 0.05, and $(K_i,V_i)$ and $\text{Energy}_{end}$ are associated therewith. Here, for $(K_i,V_i)$, collected data may be selected such that only data necessary for estimation is used, and the other data is not used.

Next, the flow of processing in the learning phase will be described below.

Step 1: When the developer or the user starts the application, the processing device 10 generates a table History for storing historical information. Although it is preferred that the processing device 10 generate History in a medium that can be used for a long time, in preparation for abnormal termination of the application, it is also possible to generate History in the memory depending on the implementation requirements.

If History that has been generated in the past is present, the processing device 10 empties History by executing learning-model update processing in Step 4, to be described later.

Step 2: When the developer or the user starts execution of a piece of content for which an identifier has been defined by the developer, the processing device 10 adds a new entry $\text{Item}_t$ to History generated in Step 1 and records the following four kinds of information.

ContentID of the piece of content that is started

Time $\text{Time}_{start}$ when this piece of content is started

Battery level $\text{Energy}_{start}$ at the time when this piece of content is started Hardware-component/sensor information $[(K_1,V_1) \ldots (K_n,V_n)]$ at the time when this piece of content is started Step 3: When the developer or the user ends the execution of the piece of content for which the identifier has been defined by the developer, the processing device 10 records the following two kinds of information in History generated in Step 1 and updated in Step 2.

Time $\text{Time}_{end}$ when this piece of content is ended

Battery level $\text{Energy}_{end}$ at the time when this piece of content is ended Step 4: When the developer or the user suspends or ends the execution of the game, the processing device 10 updates the estimation model by using $\text{Item}_{t1} \ldots \text{Item}_{tk}$ recorded in History and empties History when the updating is completed.

In this Example, the processing device 10 uses $\text{Item}_{t1} \ldots \text{Item}_{tk}$ recorded in History to update the table PatternMatchTable shown in FIG. 9. Specifically, the processing device 10 scans History and executes the following Step 4-1 and Step 4-2 for each element $\text{Item}_t$.

Step 4-1: First, the processing device 10 sets, for the battery level $\text{Energy}_{start}$ at the start time of a piece of content, a plurality of index values $\text{Energy}_{startindex}$, e.g., [0, 0.05, 0.10, ... 0.95, 1.00]. Then, the processing device 10 identifies $\text{Energy}_{startindex}$ that is the closest to $\text{Energy}_{start}$ of a processing target $\text{Item}_t$ among a plurality of $\text{Item}_t$ recorded in History. For example, in the case where the $\text{Energy}_{startindex}$ is set at intervals of 0.05, as described above, if $\text{Energy}_{start}$ of the processing target $\text{Item}_t$ is 0.76, then 0.75 is identified as the closest $\text{Energy}_{startindex}$.

Furthermore, the processing device 10 extracts elements necessary for estimation from the hardware-component/sensor information ($[(K_1,V_1), \ldots (K_m,V_m)]$) of the processing target $\text{Item}_t$. The same array may be used in the simplest case.

Step 4-2: Next, the processing device 10 searches, in PatternMatchTable shown in FIG. 9, for a row in which the values in the columns of ContentID and [($K_1,V_1$), . . . ($K_m,V_m$)] match the values included in the processing target Item$_t$ and in which the value in the column of Energy$_{start}$ matches Energy$_{startindex}$ identified in Step 4-1.

In the case where there is no matching row, the processing device 10 adds ContentID, Energy$_{end}$, and [($K_1,V_1$), . . . ($K_m,V_m$)] included in the processing target Item$_t$ and Energy$_{startindex}$ identified in Step 4-1, as a new row, to PatternMatchTable shown in FIG. 9.

On the other hand, in the case where there is a matching row, the processing device 10 updates the value of Energy$_{end}$ in that row on the basis of the value of Energy$_{end}$ included in the processing target Item$_t$. For example, in consideration of deterioration of the battery, it is also possible to update the value of Energy$_{end}$ in that row to the latest value (the value of Energy$_{end}$ included in the processing target Item$_t$).

Alternatively, it is also possible to update the value of Energy$_{end}$ in that row to a statistical value (the maximum value, the minimum value, the average value, or the like) of the value of Energy$_{end}$ in that row and the value of Energy$_{end}$ included in the processing target Item$_t$. Alternatively, it is also possible to update the value of Energy$_{end}$ in that row to the total value of values obtained by multiplying the value of Energy$_{end}$ in that row and the value of Energy$_{end}$ included in the processing target Item$_t$ by individual weight factors.

Estimation Phase

Next, the estimation phase of this Example will be described below. In this Example, when a transition is made to a screen for allowing the user to select a piece of content to be executed, battery consumption amounts are predicted, through pattern matching, for individual pieces of content to be displayed in this screen. Specifically, in the table (FIG. 9) used for pattern matching, rows are found in which the battery level of the terminal device at the time of estimation and the hardware-component/sensor information at that time match those in the rows, excluding the column of Energy$_{end}$.

For example, it is assumed that, when a user who uses a terminal device of OS001 connects the terminal device to a network by a connection method of NW001, a transition is made to a screen on which two pieces of content (001-NORMAL and 001-HARD) are displayed. If it is assumed that the battery level of the terminal device at that time is 0.76, the processing device 10 searches PatternMatchTable, which is shown in FIG. 9, for a row(s) in which the value of ContentID matches "001-NORMAL" or "001-HARD", the value of $K_1$(OS) matches "OS001", the value of $K_2$(Network) matches "NW001", and the value of Energy$_{start}$ is the closest to "0.76".

As a result, the second row from the top is identified for ContentID "001-NORMAL", and the fifth row from the top is identified for ContentID "001-HARD". As a result, the processing device 10 estimates that "the battery level will become 0.73 in the case where 001-NORMAL is executed" and "the battery level will become 0.69 in the case where 001-HARD is executed". When these results are reflected on the screen, the processing device 10 may display the results after converting the results into formats that are easy for the user to understand, as in "the battery level will become 73% in the case where 001-NORMAL is executed" and "the battery level will become 69% in the case where 001-HARD is played".

Next, the flow of processing in the inference phase will be described below.

Step 1: When the user performs an input for making a transition to a screen for allowing the user to select a piece of content, the processing device 10 obtains, as an array of ContentID, a list of pieces of content to be displayed on that screen. Furthermore, the processing device 10 receives, from the OS of the terminal device, the battery level Energy$_{start}$ at that time and hardware-component/sensor information [($K_1,V_1$), . . . ($K_m,V_m$)] at that time.

Step 2: The processing device 10 scans the received array of ContentID and predicts, for each ContentID, a battery level obtained after the corresponding piece of content is executed. Specifically, the processing device 10 searches for a matching row by using PatternMatchTable, which is shown in FIG. 9. In the simplest case, only when there is an exactly matching (Exact-Match) row, this system predicts that the battery level after play is Energy$_{end}$ included in that row. Then, when there is no exactly matching (Exact-Match) row, the processing device 10 may output a result indicating that "a battery consumption amount is unknown".

For example, the processing device 10 may perform Steps 2-1 to 2-3, to be described below, for each ContentID included in the array of ContentID.

Step 2-1: The processing device 10 identifies, in PatternMatchTable, shown in FIG. 9, all rows in which the processing target ContentID matches those in the rows. In the case where there is no matching row, the processing device 10 outputs a result indicating that a battery consumption amount in the case where the piece of content identified by the processing target ContentID is executed is "unknown". In the case where there is at least one matching row, the processing device 10 executes processing in the next step.

Step 2-2: The processing device 10 identifies, from among the row(s) identified in Step 2-1, a row in which the battery level Energy$_{start}$ obtained in Step 1 is the closest to that in the row. Specifically, the processing device 10 identifies a row for which the absolute value of the difference between the Energy$_{start}$ shown in this row and the battery level Energy$_{start}$ obtained in Step 1 is the smallest. In the case where one row is identified, the processing device 10 outputs a result indicating that a battery consumption amount when the piece of content identified by the processing target ContentID is executed is Energy$_{end}$ shown in that identified row. On the other hand, in the case where a plurality of rows are identified, the processing device 10 executes Step 2-3.

Step 2-3: The processing device 10 identifies, from among the rows identified in Step 2-2, a row in which the hardware-component/sensor information [($K_1,V_1$), . . . ($K_m,V_m$)] obtained in Step 1 is the closest to that in the row. Note that the method for calculating closeness (similarity) of m-dimensional information is not particularly limited, and any method can be adopted. In the case where one row is identified, the processing device 10 outputs a result indicating that a battery consumption amount in the case where the piece of content identified by the processing target ContentID is executed is Energy$_{end}$ shown in that identified row. On the other hand, in the case where a plurality of rows are identified, the processing device 10 identifies one row from among the plurality of identified rows by an arbitrary method. Then, the processing device 10 outputs a result indicating that a battery consumption amount in the case where the piece of content identified by the processing target ContentID is executed is Energy$_{end}$ shown in that identified row.

Step 3: The processing device 10 passes the estimation result of the battery consumption amount for each ContentID to an application system. The application system draws a screen in which the received estimation result is reflected and displays the screen on the display. At this time, the application system may display the result obtained by estimating a battery level after execution of the content as it is or may display a battery consumption amount calculated by subtracting the battery level after execution of the content from the battery level before execution of the content.

<Operation Effect>

The processing device 10 can notify the user of a battery consumption amount in the case where predetermined processing using the terminal device is executed, before the predetermined processing is executed. According to this technique, the user can judge whether this processing is executed now, by considering the battery consumption amount in the case where the predetermined processing is executed.

Furthermore, the processing device 10 predicts a battery consumption amount on a piece-of-content basis and notifies the user of the result. A piece of content is one of the processing procedures that can be executed in an application. Thus, the hardware processing load range while one piece of content is executed (the range from the time when the processing load is the largest to the time when the processing load is the smallest) is less than the hardware processing load range while one application, in which a plurality of pieces of content can be sequentially executed in a selective manner, is executed. Furthermore, the time range required to execute one piece of content (time from start to end of the piece of content) is less than the time range required to execute one application, in which a plurality of pieces of content can be sequentially executed in a selective manner. Thus, in the case where a battery consumption amount is estimated on a piece-of-content basis, the accuracy of the estimation becomes higher than a case where a battery consumption amount is estimated on an application basis. As a result, useful information with high estimation accuracy can be provided to the user.

Furthermore, for example, the processing device 10 can estimate a battery consumption amount by using the estimation model, which has learnt, on pieces of loop content in an application that are assumed to be repeatedly executed many times, the tendencies of battery consumption amounts for the individual pieces of content, and can notify the estimation results when the user selects a piece of content. Accordingly, independent battery control can be performed for the user.

Furthermore, the processing device 10 obtains data in the form of the hardware/software status, whereby an execution environment can be naturally considered; thus, the present invention can be applied to various mobile terminals.

Furthermore, since the processing device 10 handles only a content ID and does not handle specific details of a piece of content at all, the developer of an application does not need to add special settings for realizing the processing of this embodiment. Thus, it is possible to use existing pieces of content as they are and to automatically cause the processing device 10 to estimate a battery consumption amount when a new piece of content is added in the usual manner. In this way, the present invention can be applied without changing the existing game development pipeline.

Furthermore, the processing device 10 may be realized at the side of the terminal device or at the side of the server. That is, data collected at the terminal device of the user may be used in learning at an edge side as is or may be sent to the server and used in learning at a cloud side. Accordingly, the developer can select learning at the edge side if real-time learning or maintenance of user privacy is emphasized or learning at the cloud side if a reduction in the load on the terminal is emphasized, depending on the characteristics of an application. In this way, the processing device 10 is highly versatile.

Examples of reference embodiments are added below.

1. A processing device including:

an information accumulating unit that obtains execution-time state information indicating the state of a terminal device when a piece of content in an application installed in the terminal device is executed and battery information indicating a battery consumption amount when the piece of content is executed and that accumulates the obtained information in a storage means;

an estimation-model generating unit that generates an estimation model for estimating a battery consumption amount when the piece of content is executed, from the information indicating the state of the terminal device on the basis of the execution-time state information and the battery information, which are accumulated in the storage means;

an estimation unit that obtains estimation-time state information indicating the state of the terminal device at a predetermined estimation timing and that estimates a battery consumption amount when the piece of content is executed at the terminal device in the state indicated by the estimation-time state information, on the basis of the estimation-time state information and the estimation model; and an output unit that outputs an estimation result obtained from the estimation unit.

2. A processing device according to 1, wherein a plurality of pieces of content can be executed in the application, wherein the information accumulating unit accumulates, for each of the pieces of content, the execution-time state information and the battery information in the storage means, wherein the estimation-model generating unit generates, for each of the pieces of content, the estimation model for estimating a battery consumption amount when that piece of content is executed, and wherein the estimation unit estimates a battery consumption amount when each of the pieces of content is executed.

3. A processing device according to 1, wherein a plurality of pieces of content can be executed in the application, wherein the information accumulating unit accumulates, for each of the pieces of content, the execution-time state information and the battery information in the storage means, wherein the estimation-model generating unit generates, for each group, the estimation model on the basis of at least the execution-time state information and the battery information for the piece of content that belongs to that group, and wherein the estimation unit identifies the group to which a target piece of content, which is the piece of content for which a battery consumption amount is to be estimated, belongs and estimates a battery consumption amount when the target piece of content is executed, on the basis of the estimation model corresponding to the identified group.

4. A processing device according to one of 1 to 3, wherein, when the terminal device accepts an input for displaying a reception screen on which an input for starting execution of the piece of content is accepted, the estimation unit obtains the estimation-time state information, which indicates the state of the terminal device, in response to the acceptance of the input for displaying the reception screen, and estimates a battery consumption amount when the piece of content is executed at the terminal device in the state indicated by the estimation-time state information, on the basis of the estimation-time state information and the estimation model, and the output unit displays the estimation result on the reception screen in linkage with the piece of content.

5. A processing method for a computer to:

obtain execution-time state information indicating the state of a terminal device when a piece of content in an application installed in the terminal device is executed and battery information indicating a battery consumption amount when the piece of content is executed and accumulates the obtained information in a storage means;

generate an estimation model for estimating a battery consumption amount when the piece of content is executed, from the information indicating the state of the terminal device, on the basis of at least the execution-time state information and the battery information, which are accumulated in the storage means; and obtain estimation-time state information indicating the state of the terminal device at a predetermined estimation timing, estimates a battery consumption amount when the piece of content is executed at the terminal device in the state indicated by the estimation-time state information, on the basis of the estimation-time state information and the estimation model, and outputs an estimation result.

6. A program for causing a computer to function as:

an information accumulating means for obtaining execution-time state information that indicates the state of a terminal device when a piece of content in an application installed in the terminal device is executed and battery information that indicates a battery consumption amount when the piece of content is executed and for accumulating the obtained information in a storage means;

an estimation-model generating means for generating an estimation model that estimates a battery consumption amount when the piece of content is executed, from the information indicating the state of the terminal device on the basis of the execution-time state information and the battery information, which are accumulated in the storage means;

an estimation means for obtaining estimation-time state information indicating the state of the terminal device at a predetermined estimation timing and for estimating a battery consumption amount when the piece of content is executed at the terminal device in the state indicated by the estimation-time state information, on the basis of the estimation-time state information and the estimation model; and an output means for outputting an estimation result obtained from the estimation means.

This application claims the priority of Japanese Patent Application No. 2020-081051 filed on May 1, 2020, which is hereby incorporated herein by reference in its entirety.

REFERENCE SIGNS LIST 1A processor
2A memory
3A input/output I/F
4A peripheral circuit
5A bus
10 processing device
11 information accumulating unit
12 estimation-model generating unit
13 estimation unit
14 output unit
15 storage unit

The invention claimed is:

1. A processing device comprising:

a processor; and a memory connected to the processor, wherein the memory comprises a program configured to perform a method comprising:

obtaining, from a first terminal device and over a communication network, first execution-time state information indicating a state of the first terminal device based on at least one game function in a first computer game application installed in the first terminal device being executed, wherein the first execution-time state information comprises a content-start time of the first computer game application and a content-end time of the first computer game application being executed;

obtaining, from the first terminal device and over the communication network, first battery information indicating a first battery consumption amount based on the at least one game function being executed on the first terminal device, wherein the first battery information is obtained via a battery sensor connected to a first battery in the first terminal device, and wherein the first battery information comprises a first battery level for the content-start time and a second battery level for the content-end time;

accumulating battery information from a plurality of terminal devices to produce accumulated battery information, wherein the accumulated battery information comprises the first battery information;

generating a first estimation model for estimating a second battery consumption amount when the at least one game function is executed, wherein the first estimation model is generated based on the first execution-time state information and the accumulated battery information;

obtaining, using the first estimation model, a plurality of predicted battery consumption amounts for a second battery in a second terminal device at a predetermined estimation timing, wherein a respective predicted battery consumption amount among the plurality of predicted battery consumption amounts corresponds to a respective game function among a first plurality of game functions performed by the first computer game application, and wherein the first estimation model uses as model inputs a second execution-time state information for the second terminal device and a second battery information for the second terminal device;

sending, over the communication network to the second terminal device, the plurality of predicted battery consumption amounts, wherein the plurality of predicted battery consumption amounts are displayed on a first reception screen on the second terminal device;

obtaining, over the communication network and from the first reception screen of the second terminal device, a user selection of a first game function among the first plurality of game functions in response to displaying the plurality of predicted battery consumption amounts; and executing, based on communicating with the second terminal device over the communication network, the first game function within the first computer game application that corresponds to the user selection.

2. A processing device according to claim 1,
wherein a second plurality of game functions can be executed in a second computer game application,
wherein the method further comprises:
generating, for the second plurality of game functions, a plurality of estimation models when a respective game function among the second plurality of game functions is executed, and
estimating a third battery consumption amount when each of the second plurality of game functions is executed.

3. A processing device according to claim 1,
wherein a second plurality of game functions can be executed in a second computer game application,
wherein the method further comprises:
generating, for a plurality of groups, a plurality of estimation models based on at least a third execution-time state information and a third battery information for the second plurality of game functions, wherein a respective group among the plurality of groups corresponds to a respective estimation model among the plurality of estimation models, and
identifying a group among the plurality of groups to determine an identified group which a target game function among the second plurality of game functions for which a third battery consumption amount is to be estimated belongs, and
estimating the third battery consumption amount when the target game function is executed, based on a second estimation model among the plurality of estimation models corresponding to the identified group.

4. A processing device according to claim 1,
wherein, when a third terminal device accepts a first input for displaying a second reception screen on which a second input for starting execution of a second game function is accepted,
wherein the third terminal device obtains an additional predicted battery consumption amount in response to an acceptance of the first input for displaying the second reception screen, and
estimating a third battery consumption amount when the second game function is executed at the third terminal device in a state indicated by the additional predicted battery consumption amount, based on the additional predicted battery consumption amount and the first estimation model, and
displaying the additional predicted battery consumption amount on the second reception screen in linkage with the second game function.

5. A method comprising:
obtaining, from a first terminal device and over a communication network, first execution-time state information indicating a state of the first terminal device based on at least one game function in a computer game application installed in the first terminal device being executed, wherein the first execution-time state information comprises a content-start time of the computer game application and a content-end time of the computer game application being executed;
obtaining, from the first terminal device and over the communication network, first battery information indicating a first battery consumption amount based on the at least one game function being executed on the first terminal device, wherein the first battery information is obtained via a battery sensor connected to a first battery in the first terminal device, and wherein the first battery information comprises a first battery level for the content-start time and a second battery level for the content-end time;
accumulating battery information from a plurality of terminal devices to produce accumulated battery information, wherein the accumulated battery information comprises the first battery information;
generating an estimation model for estimating a second battery consumption amount when the at least one game function is executed, wherein the estimation model is generated based on the first execution-time state information and the accumulated battery information;
obtaining, using the estimation model, a plurality of predicted battery consumption amounts for a second battery in a second terminal device at a predetermined estimation timing,
wherein a respective predicted battery consumption amount among the plurality of predicted battery consumption amounts corresponds to a respective game function among a plurality of game functions performed by the computer game application, and
wherein the estimation model uses as model inputs a second execution-time state information for the second terminal device and a second battery information for the second terminal device;
sending, over the communication network to the second terminal device, the plurality of predicted battery consumption amounts,
wherein the plurality of predicted battery consumption amounts are displayed on a reception screen on the second terminal device;
obtaining, over the communication network and from the reception screen of the second terminal device, a user selection of a game function among the plurality of game functions in response to displaying the plurality of predicted battery consumption amounts; and
executing, based on communicating with the second terminal device over the communication network, the game function within the computer game application that corresponds to the user selection.

6. A nontransitory computer-readable medium comprising a program for causing a computer to perform a method comprising:
obtaining, from a first terminal device and over a communication network, first execution-time state information indicating a state of the first terminal device based on at least one game function in a computer game application installed in the first terminal device being executed, wherein the first execution-time state information comprises a content-start time of the computer game application and a content-end time of the computer game application being executed;
obtaining, from the first terminal device and over the communication network, first battery information indicating a first battery consumption amount based on the at least one game function being executed on the first terminal device, wherein the first battery information is obtained via a battery sensor connected to a first battery in the first terminal device, and wherein the first battery information comprises a first battery level for the content-start time and a second battery level for the content-end time;
accumulating battery information from a plurality of terminal devices to produce accumulated battery information, wherein the accumulated battery information comprises the first battery information;

generating an estimation model for estimating a second battery consumption amount when the at least one game function is executed, wherein the estimation model is generated based on the first execution-time state information and the accumulated battery information;

obtaining, using the estimation model, a plurality of predicted battery consumption amounts for a second battery in a second terminal device at a predetermined estimation timing, wherein a respective predicted battery consumption amount among the plurality of predicted battery consumption amounts corresponds to a respective game function among a plurality of game functions performed by the computer game application, and wherein the estimation model uses as model inputs a second execution-time state information for the second terminal device and a second battery information for the second terminal device;

sending, over the communication network to the second terminal device, the plurality of predicted battery consumption amounts, wherein the plurality of predicted battery consumption amounts are displayed on a reception screen on the second terminal device;

obtaining, over the communication network and from the reception screen of the second terminal device, a user selection of a game function among the plurality of game functions in response to displaying the plurality of predicted battery consumption amounts; and executing, based on communicating with the second terminal device over the communication network, the game function within the computer game application that corresponds to the user selection.

\* \* \* \* \*